United States Patent [19]

Fukuda et al.

[11] 4,454,195
[45] Jun. 12, 1984

[54] MAGNETIC RECORDING MEDIUM

[75] Inventors: Kazumasa Fukuda; Yoshimi Kitahara, both of Tokyo, Japan

[73] Assignee: TDK Electronics Co., Ltd., Tokyo, Japan

[21] Appl. No.: 397,236

[22] Filed: Jul. 12, 1982

[30] Foreign Application Priority Data

Aug. 27, 1981 [JP] Japan .................................. 56-134650

[51] Int. Cl.³ ............................................... G11B 5/70
[52] U.S. Cl. ..................................... 428/336; 360/134; 360/135; 360/136; 204/192 M; 427/132; 428/457; 428/458; 428/692; 428/694; 428/900
[58] Field of Search ............... 428/900, 692, 693, 694, 428/457, 458, 336; 204/192 M; 360/134–136; 427/132

[56] References Cited

U.S. PATENT DOCUMENTS 3,206,325 9/1965 Averbach ........................... 427/132
4,226,681 10/1980 Shirahata ............................ 427/132
4,407,894 10/1983 Kadokura ........................... 428/900

FOREIGN PATENT DOCUMENTS 2007842 10/1970 Fed. Rep. of Germany ...... 204/192

Primary Examiner—Ellis P. Robinson
Attorney, Agent, or Firm—Oblon, Fisher, Spivak, McClelland & Maier

[57] ABSTRACT

A magnetic recording medium has a magnetic recording layer comprising from 75 to 90% by weight of Co and up to 5% by weight of Cr, the rest being V. The magnetic recording layer has an easy magnetization axis in the perpendicular direction to the layer surface. The magnetic recording medium is prepared by sputtering a composition of Co-V-Cr onto a substrate at an industrially feasible deposition speed of at least 3000 Å/min to form the above mentioned recording layer on the substrate.

8 Claims, 1 Drawing Figure

MAGNETIC RECORDING MEDIUM

BACKGROUND OF THE INVENTION

1. Filed of the Invention

The present invention relates to a magnetic recording medium, and more particularly to a magnetic recording medium having the easy magnetization axis in the perpendicular direction to the surface of the medium.

2. Description of the Invention

A perpendicular type magnetic recording system in which the magnetic recording medium is magnetized in a direction perpendicular to the surface of the recording medium, is disclosed in Japanese Unexamined Patent Publication 134706/1977. Extensive researches are being made by various circles on the perpendicular type magnetic recording as a prospective system expected to be commercially available in near future as a super high density recording system.

It has generally been accepted that a Co-Cr layer formed by sputtering is most suitable as a recording medium for such a perpendicular type magnetic recording system.

During the course of the study of the Co-Cr layer from the standpoint of mass proudction and practical applications, however, the present inventors have found that there is a certain practical problem involved. Namely, when the deposition speed (i.e. the sputtering speed) is increased in an attempt to reduce the proudction costs, the coercive force (Hc ($\perp$)) tends to increase correspondingly, thus leading to a difficulty that no adequate overwrite characteristic is thereby obtainable in the actual digital recording.

The overwrite characteristic must be at least 25 dB. To obtain the overwrite characteristic of such a level, the coercive force (Hc ($\perp$)) must be at most 600 Oe.

When the deposition speed (i.e. the sputtering speed) is at a low level (i.e less than several hundreds Å/min), it is possible to produce a Co-Cr layer having a coercive force (Hc ($\perp$)) of less than 600 Oe by controlling the cooling of the substrate. However, the production costs by such an inefficient operation become extremely high and it is impossible to practice the production on an industrial scale.

At an industrially feasible deposition speed (i.e. greater than several thousands Å/min), the coercive force (Hc ($\perp$)) inevitably becomes to be at least 600 Oe even when the cooling efficiency of the substrate is raised to the maximum level, and it sometimes reaches a level as high as 2000 Oe in an extreme case.

SUMMARY OF THE INVENTION

It is therefore an object of the present invention to overcome the above mentioned difficulty and to provide a magnetic recording medium of a perpendicular magnetization type which is capable of being produced at an industrially feasible deposition speed.

The present invention provides a magnetic recording medium having a magnetic recording layer comprising from 75 to 90% by weight of Co and upto 5% by weight of Cr, the rest being V and having the easy manetization axis in the perpendicular direction to the surface of the recording layer.

BRIEF DESCRIPTION OF THE DRAWING

The FIGURE is a graph showing the relation between the weight ratio of Cr/(Co+V+Cr) and the coercive force (Hc ($\perp$)) at the deposition speed of 3000 Å/min.

DETAILED DESCRIPTION OF THE PREFERRED EMBODIMENT

Figure 1:
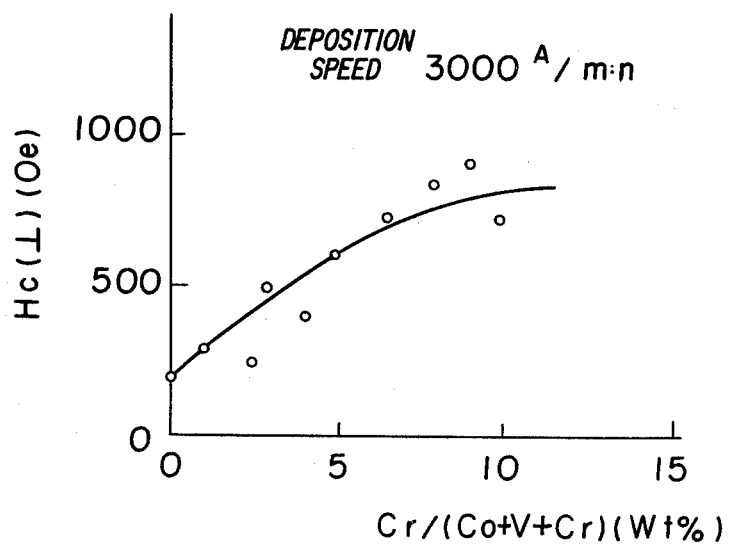

A medium used for the perpendicular magnetic recording system is required to have a large magnetic anisotropy in the perpendicular direction to the surface of the medium, and the magnetic anisotropy can be represented by a half value width ($\Delta\theta 50$) of a X-ray (002) reflection rocking curve.

The Co-V-Cr layer as identified above according to the present invention has a half value width ($\Delta\theta 50$) of the X-ray reflection rocking curve being within 5° which is equal to that of the Co-Cr layer, and even when formed by deposition (i.e. sputtering) at a high speed of at least several thousands Å/min, its coercive force (Hc ($\perp$)) does not exceed 600 Oe and an adequate overwrite characteristic (i.e. more than 25 dB) is thereby obtainable.

In the present invention, the ratio of Co is from 75 to 90% by weight, preferably from 80 to 85% by weight, based on the total weight of Co, V and Cr. If the Co ratio is less than 75% by weight, the resulting layer tends to be non-magnetic, and if the Co ratio exceeds 90% by weight, the resulting layer will not satisfy $Hk \geq 4\pi Ms$ (where Hk is an anisotropic magnetic field, and Ms is saturation magnetization) which is a basic requirement for a perpendicular magnetization layer.

The ratio of Cr is upto 5% by weight, preferably from 1 to 4% by weight. As shown in the FIGURE, this is a condition required to ensure that the coercive force (Hc ($\perp$)) will not exceed 600 Oe even when the layer is formed by sputtering at a deposition speed of 3000 Å/min which is regarded as the minimum speed required for the industrial operation. Namely, this is a condition required to obtain an overwrite characteristic within an allowable range of at least 25 dB.

The Co-V-Cr layer of the present invention is formed on a substrate by sputtering in a thickness of from 2000 Å to 2$\mu$. The substrate may be the one commonly used for conventional magnetic recording media. The sputtering is performed at a deposition speed of at least 3000 Å/min, preferably from 4000 to 8000 Å/min in order to form the Co-V-Cr layer in an industrially feasible manner.

Now, the present invention will be described in detail with reference to an Example.

EXAMPLE

While changing the composition ratio of Co-V-Cr, sputtering was performed by means of a high speed sputtering apparatus under the following conditions:

| | |
|---|---|
| Argon gas pressure | $5.0 \times 10^{-3}$ Torr |
| Inlet electric power | 3-5 KW |
| Distance between electrodes | 100 mm |

The half value width ($\Delta\theta 50$), the coercive force (Hc ($\perp$)) and the overwrite characteristic of each layer thereby obtained were measured. The results thereby obtained are shown in Table 1 together with the results obtained by a Comparative Example.

TABLE 1

|  | Compositions | deposition speed (Å/min.) | Δθ 50 (°) | Hc (⊥) (Oe) | overwrite characteristic (dB) |
|---|---|---|---|---|---|
| No. 1 | Co-15 wt % V-3 wt % Cr | 5200 | 2.9 | 460 | 30 |
| No. 2 | Co-13 wt % V-5 wt % Cr | 3000 | 2.8 | 600 | 26 |
| No. 3 | Co-14 wt % V-2 wt % Cr | 4600 | 3.1 | 380 | 36 |
| No. 4 | Co-17 wt % V | 4800 | 2.9 | 200 | 37 |
| Comparative Example | Co-18 wt % Cr | 3000 | 3.2 | 1100 | 12 |

From the above Table, it is seen that the Co-V or Co-V-Cr layers according to the present invention provide superior perpendicular magnetic recording media which satisfy both the requirement for a high deposition speed i.e. the requirement for an industrially feasible production costs and the requirement for the overwrite characteristic i.e. the practical requirement.

I claim:

1. A magnetic recording medium having a magnetic recording layer comprising from 75 to 90% by weight of Co and up to 5% by weight of Cr, the rest being V, said magnetic recording layer having an easy magnetization axis in the perpendicular direction to the layer surface, being of a thickness of from 2000 Å to 2µ, and having a coercive force of at most 600 Oe.

2. The magnetic recording medium according to claim 1 wherein the magnetic recording layer comprises 80 to 85% by weight of Co and from 1 to 4% by weight of Cr, the rest being V.

3. A process for producing a magnetic recording medium which comprises sputtering a composition comprising from 75 to 90% by weight of Co and up to 5% by weight of Cr, the rest being V, onto a substrate to a thickness of from 2000 Å to 2µ at a deposition speed of at least 3000 Å/min. to form on the substrate a magnetic recording layer of a coercive force of at most 600 Oe.

4. A magnetic recording medium having a magnetic recording layer comprising from 75 to 90% by weight of Co and 1 to 5% by weight of Cr, the rest being V, said magnetic recording layer having an easy magnetization axis in the perpendicular direction to the layer surface, being of a thickness of from 2000 Å to 2µ, and having a coercive force of at most 600 Oe.

5. The magnetic recording medium according to claim 4 wherein the magnetic recording layer comprises 80 to 85% by weight of Co and from 1 to 4% by weight of Cr, the rest being V.

6. The process according to claim 3 wherein the magnetic recording layer comprises 80 to 85% by weight of Co and from 1 to 4% by weight of Cr, the rest being V.

7. A process for producing a magnetic recording medium which comprises sputtering a composition comprising from 75 to 90% by weight of Co and 1 to 5% by weight of Cr, the rest being V, onto a substrate to a thickness of from 2000 Å to 2µ at a deposition speed of at least 3000 Å/min. to form on the substrate a magnetic recording layer of a coercive force of at most 600 Oe.

8. The process according to claim 7 wherein the magnetic recording layer comprises 80 to 85% by weight of Co and from 1 to 4% by weight of Cr, the rest being V.

* * * * *